United States Patent

Hegner et al.

[11] Patent Number: 5,954,900
[45] Date of Patent: Sep. 21, 1999

[54] PROCESS FOR JOINING ALUMINA CERAMIC BODIES

[75] Inventors: Frank Hegner, Lörrach; Elke Maria Schmidt, Schopfheim; Andreas Rossberg, Bad Säckingen; Bärbel Voigtsberger, Bad Klosterlausnitz; Ingolf Voigt, Jena; Henry Ludwig, Gera, all of Germany

[73] Assignee: ENVEC Mess- und Regeltechnik GmbH + Co., Weil am Rhein, Germany

[21] Appl. No.: 08/935,417

[22] Filed: Sep. 23, 1997

Related U.S. Application Data

[60] Provisional application No. 60/028,815, Oct. 17, 1996.

[30] Foreign Application Priority Data

Oct. 4, 1996 [EP] European Pat. Off. ............. 96115962

[51] Int. Cl.⁶ ........................... B32B 31/26; C04B 37/00; G01L 9/12
[52] U.S. Cl. .................................. 156/89.11; 156/89.12; 156/306.6; 73/780; 361/283.4
[58] Field of Search ............................. 156/89.11, 89.12, 156/306.6; 73/780; 361/283.3, 283.4

[56] References Cited

U.S. PATENT DOCUMENTS

| | | |
|---|---|---|
| 3,239,323 | 3/1966 | Folweiler . |
| 3,736,222 | 5/1973 | Arendt . |
| 4,177,496 | 12/1979 | Bell et al. . |
| 4,388,668 | 6/1983 | Bell et al. . |
| 4,426,673 | 1/1984 | Bell et al. . |
| 4,780,160 | 10/1988 | Kipp . |
| 4,780,161 | 10/1988 | Mizuhara . |
| 4,980,236 | 12/1990 | Oomen et al. . |
| 5,005,421 | 4/1991 | Hegner et al. . |
| 5,050,034 | 9/1991 | Hegner et al. . |
| 5,050,035 | 9/1991 | Hegner et al. . |
| 5,334,344 | 8/1994 | Hegner et al. . |
| 5,349,492 | 9/1994 | Kimura et al. ..................... 361/283.4 |
| 5,539,611 | 7/1996 | Hegner et al. ..................... 361/283.4 |

FOREIGN PATENT DOCUMENTS 27 09 945 A1   3/1976   Germany .

*Primary Examiner*—Curtis Mayes
*Attorney, Agent, or Firm*—Bose McKinney & Evans

[57] ABSTRACT

This process serves to form a long-time-vacuum-tight, high-strength, and corrosion-resistant joint, by means of a joining material, between a first body and a second body each made of sintered, polycrystalline alumina ceramic with a purity greater than 92 wt. % or of sapphire. The joining material is interposed in the form of a paste, a foil, or a slip between the first body and the second body. The joining material has been made from 1) an agglomerate-free, highly disperse, high-purity α-alumina powder with particles of as high a degree of calcination as possible and of a size not exceeding 100 nm (=$10^{-7}$ m), 2) an anorganic oxidic powder of an auxiliary sintering agent with particles of approximately the same size as the particle size of the α-alumina powder, 3) an organic vehicle which is dissolved or suspended in an organic or aqueous solvent and in which the particles of the respective powder are distributed as evenly as possible. Instead of the anorganic oxidic powder of an auxiliary sintering agent an anorganic oxidic auxiliary sintering agent produced chemically as envelopes around or attachment to the particles of the α-alumina powder can be used, the total α-alumina and auxiliary-sintering-agent content of the paste, the foil, or the slip ranging between 50% and 70%. After interposing the joining material the bodies are heated to a temperature of not more than 1,300° C. and then allowing them to cool down.

10 Claims, No Drawings

PROCESS FOR JOINING ALUMINA CERAMIC BODIES

This application claims benefit of provisional application Ser. No. 60/028,815 filed Oct. 17, 1996.

FIELD OF THE INVENTION

The present invention relates to a process for forming a long-time vacuum-tight, corrosion-resistant, and high-strength joint between a first body and a second body each made of sintered alumina ceramic or sapphire.

BACKGROUND OF THE INVENTION

Alumina ceramic used in technical processes common contains more than approximately 92 wt. % alumina and less than approximately 8 wt. % of an auxiliary sintering agent, such as silicon dioxide, titanium dioxide, magnesium oxide, or calcium oxide. In most cases a 96 wt. % alumina ceramic is used, which thus contains 4 wt. % auxiliary sintering agent and whose sintering temperature is approximately 1,500° C.

In special cases, the alumina ceramic may also be particularly pure (99.5 wt. % alumina), i.e., the ceramic contains only an extremely small percentage of an auxiliary sintering agent; the sintering temperature is then approximately 1,600° C.

A special application of such alumina ceramic are ceramic pressure sensors. Such sensors, as is well known, comprise a ceramic substrate and a ceramic diaphragm which is jointed to the substrate near its edge to form an internal chamber.

As a material for joining the sintered alumina ceramic bodies, U.S. Pat. No. 4,177,496 describes a glass frit, and U.S. Pat. Nos. 5,005,421 or 5,334,344 an active brazing solder.

Because of the more or less differing thermal expansion coefficients of glass frit or active brazing solder and alumina ceramic, both materials pose problems, particularly if an optimum match is required over a wide temperature range. Although active brazing alloys can be found where this match appears satisfactory, cf. the U.S. Provisional Application Ser. No. 60/023,079 filed Aug. 02, 1996 and the copending U.S. Non-Provisional Application Ser. No. 08/896,481 filed on Jul. 18, 1997, the need for optimally matched thermal expansion coefficients of alumina ceramic and joining material still exists.

SUMMARY OF THE INVENTION

Therefore, the inventors have based the solution of this problem on the idea not to use a glass frit or an active brazing solder for the joining material, but to try to use alumina itself as the joining material, because this per se results in the thermal expansion coefficients of alumina ceramic and joining material being identical.

While unsintered alumina bodies, i.e., so-called green compacts, readily unite during the sintering process without a joining material, the realization of a joint between already sintered alumina bodies by means of high-purity alumina presents considerable practical difficulties and meets with theoretical doubts, if not prejudices. "High purity" as used herein means a purity of at least 99.9 wt. %.

These doubts are based on the mere fact, for example, that an already sintered high-purity alumina ceramic body and a high-purity alumina green compact cannot be sintered together, since the green compact shrinks isotropically by about 50%.

The inventors nevertheless have looked for ways to join sintered alumina ceramic by means of alumina at temperatures far below the sintering temperature. The joint, particularly if it is to be part of a ceramic pressure sensor, must be vacuum-tight over a long period of time, exhibit high strength, and be resistant to corrosion.

To solve these problems, the invention provides a process for forming a long-time-vacuum-tight, high-strength, and corrosion-resistant joint, by means of a joining material, between a first body and a second body each made of sintered, polycrystalline alumina ceramic with a purity greater than 92 wt. % or of sapphire, said process comprising steps of:

interposing the joining material in the form of a paste, a foil, or a slip between the first body and the second body, the joining material having been made from
an agglomerate-free, highly disperse, high-purity α-alumina powder with particles of as high a degree of calcination as possible and of a size not exceeding 100 nm ($=10^{-7}$ m), an anorganic oxidic powder of an auxiliary sintering agent with particles of approximately the same size as the particle size of the α-alumina powder, and an organic vehicle which is dissolved or suspended in an organic or aqueous solvent and in which the particles of the respective powder are distributed as evenly as possible, or with the joining material having been made from
an agglomerate-free, highly disperse, high-purity α-alumina powder with particles of as high a degree of calcination as possible and of a size not exceeding 100 nm ($=10^{-7}$ m), an anorganic oxidic auxiliary sintering agent produced chemically as envelopes around or attachment to the particles of the α-alumina powder, and an organic vehicle dissolved or suspended in an organic or aqueous solvent, with the total α-alumina and auxiliary-sintering-agent content of the paste, the foil, or the slip ranging between 50% and 70%; and heating the bodies to a temperature of not more than 1,300° C. and then allowing them to cool down, with the alumina content after cooling being at least 95 wt. % and the auxiliary-sintering-agent content after cooling being not more than 5 wt. %.

In a preferred embodiment of the invention, the anorganic content of the paste, the foil, or the slip is at least 99.9 wt. % α-alumina.

According to a development of the invention or of this preferred embodiment of the invention, in addition to the temperature, a pressure acts on the bodies.

A preferred use of the process of the invention serves to produce a ceramic, particularly capacitive, absolute-pressure or differential-pressure sensor in which the first body is a substrate and the second body a diaphragm which is connected with the substrate near its edge so as to form a long-time-vacuum-tight, high-strength, corrosion-resistant joint and an internal chamber.

The invention finally consists in the provision of a capacitive absolute-pressure sensor or a capacitive differential-pressure sensor having a substrate of alumina ceramic and a diaphragm of alumina ceramic which is mechanically connected with the substrate near its edge by means of a joining layer of alumina ceramic so as to form a long-time-vacuum-tight, high-strength, corrosion-resistant joint and an internal chamber, the opposite surfaces of the substrate and the diaphragm being each provided with at least one electrode.

A principal advantage of the invention is that, as the examination of micrographs of the joint shows, one body is connected with the other without any phase boundary, which, of course, is present in the case of glass frit or active brazing solder. The bodies are monolithically connected with one another interface-free, and the joint, like the bodies, is thus made of alumina ceramic.

Thus, the joint has the same properties as the bodies, i.e., it is just as vacuum tight over a long period of time, mechanically strong, and resistant to corrosion as the alumina ceramic itself. A joint formed from glass frit can bear much less stress in comparison. Moreover, the temperature to which the bodies must be heated is far below the above-mentioned sintering temperature of green compacts.

Further advantages of the invention will become apparent from the following detailed description of the invention, for which no drawing is necessary.

DETAILED DESCPRIPTION OF THE INVENTION

As the parent substance of a material for joining a first body and a second body of sintered, polycrystalline alumina ceramic with the above-mentioned purity, α-alumina is used. Pure α-alumina has a melting point of approximately 2,100° C. It is produced by heating aluminum hydroxide (Al—O—OH, bauxite) to a temperature of approximately 1100° C. (this is the so-called "calcination"), and remains stable after cooling down to the ambient temperature, so that it can be processed into powders, e.g., by grinding.

The sintering of 96 wt. % alumina green compacts into alumina ceramic bodies commonly takes place at approximately 1,500° C., and that of 99.5 wt. % alumina green compacts at approximately 1,600° C. Thus, the alumina contained in the sintered ceramic is virtually completely α-alumina.

The α-alumina powder with the aforementioned properties is then processed into a joining material in the form of a paste, a foil, or a slip. A slip contains, inter alia, water and is pourable into a mold, e.g., a plaster mold, which isotropically removes the water from the slip to form a dimensionally stable body of joining material. By contrast, a paste is thixotropic, so that dimensionally stable bodies of joining material formed therefrom can be applied directly to at least one of the bodies to bejoined, using a silk-screening technique, for example.

To produce the joining material, two variants are possible. According to the first variant, the joining material is formed from the above-mentioned α-alumina powder, an anorganic oxidic powder of an auxiliary sintering agent, such as silicon dioxide, titanium dioxide, magnesium oxide, or calcium oxide, and an organic vehicle in the form of a paste, a foil, or a slip. The size of the particles of the auxiliary sintering agent is approximately the same as the particle size of the α-alumina powder.

The vehicle—this term is commonly used in connection with the production of thick films and solder pastes, cf., for example, EP-A 619 161—contains, for example, a solvent, a dispersant, such as fish coil, a bonding agent, such as polyvinyl butyral, a plastifier, such as polyethylene glycol, and, if necessary, suitable further substances. The vehicle is dissolved or suspended in an organic or aqueous solvent, such as an alcohol, in which the particles of the respective powder are distributed as evenly as possible.

According to the second variant, the joining material is formed from the above-mentioned α-alumina powder, the anorganic oxidic auxiliary sintering agent, which was produced chemically, e.g., by the so-called sol-gel process, as envelopes around or attachments to the particles of the α-alumina powder, and the same organic vehicle as in the first variant. In both variants, the total α-alumina and auxiliary-sintering-agent content of the paste, the foil, or the slip ranges between 50% and 70%.

Next, a required and sufficient amount of joining material is interposed between the two bodies. The two bodies are then heated to a temperature of not more than 1,300° C. and subsequently allowed to cool down.

After the cooling, the alumina content is at least 95 wt. % and the auxiliary-sintering-agent content is not more than 5 wt. %. This is due to the fact that all constituents of the vehicle burn into carbon dioxide or vaporize and escape from the joint.

In the first variant, the anorganic content of the joining material can be readily increased to more than 99.9 wt. % α-alumina, so that practically no auxiliary sintering agent is used. Since the auxiliary-sintering-agent content of the joining material reduces the temperature required to join the two bodies as compared with the case mentioned in the preceding paragraph, a joining material with, e.g., 95 wt. % α-alumina and 5 wt. % auxiliary sintering agent only requires a temperature of about 1,100° C. to 1,200° C.

In view of the total α-alumina and auxiliary-sintering-agent content of the joining material ranging between 50% and 70% it is to be expected that nonpermissible shrinkage of the joining material occurs during heating and cooling, all the more so since only microfilters, i.e., porous bodies, and thus no vacuum-tight high-strength bodies, have so far been producible with the composition provided by the invention for the joining material.

It has turned out, however, that no isotropic shrinkage occurs, but only as anisotropic, namely uniaxial, shrinkage in the direction of the perpendicular to the two surfaces of the bodies to be joined, but no undesirable lateral shrinkage parallel to these surfaces. Obviously a rearrangement of particles occurs during the heating process.

To avoid this lateral shrinkage, it may also be advantageous to apply to the two bodies during the heating a pressure of up to 10 MPa (=100 bars). The application of such a pressure also makes it possible to increase the tightness of the joint, to lower the heating temperature, and to shorten the production time.

In the case of high-purity α-alumina powder with particles of a size less than 100 nm ($=10^{-7}$ m) an unexpected viscous phase occurs in the joint at the heating temperature, so that any cracks occurring or existing in the bodies and lying in the submicrometer or micrometer range will be closed.

It was thus quite surprising for the inventors that the object of the invention is attainable with the above-described joining materials in a highly satisfactory manner, which also overcomes a prejudice held by the experts.

The process of the invention is especially suitable for use in the fabrication of a ceramic, particularly capacitive, absolute-pressure sensor or differential-pressure sensor. In that case, the first body is the substrate of the pressure sensor and the second body the diaphragm, which is connected with the substrate near its edge to form a long-time-vacuum-tight, high-stength, and corrosion-resistant joint and an internal chamber.

It is thus possible to produce a capacitive absolute-pressure sensor or a capacitive differential-pressure sensor with a substrate of alumina ceramic and a diaphragm of alumina ceramic. The diaphragm is mechanically connected with the substrate near its edge by means of a joining layer which is also made exclusively of alumina ceramic. The opposite surfaces of the substrate and the diaphragm are each provided with at least one electrode, so that a pressure acting on and deflecting the diaphragm will result in a change in the capacitance existing between the electrodes. This change in capacitance can be measured in the usual manner.

We claim:

1. A process for forming a long-time-vacuum-tight, high-strength, and corrosion-resistant joint, by means of a joining material, between a first body and a second body each made of sintered, polycrystalline alumina ceramic with a purity greater than 92 wt. % or of sapphire, said process comprising steps of:

interposing the joining material in the form of a paste, a foil, or a slip between the first body and the second body, the joining material having been made from
  an agglomerate-free, high-purity α-alumina powder with particles of a size not exceeding 100 nm (=$10^{-7}$ m),
  an anorganic oxidic powder of an auxiliary sintering agent with particles of a size not exceeding 100 nm, and an organic vehicle which is dissolved or suspended in an organic or aqueous solvent and in which the particles of the respective powder are substantially evenly distributed,
   with the total α-alumina and auxiliary-sintering-agent content of the paste, the foil, or the slip ranging between 50% and 70%, or with the joining material having been made from
  an agglomerate-free, high-purity α-alumina powder with particles of a size not exceeding 100 nm (=$10^{-7}$ m),
  an anorganic oxidic auxiliary sintering agent produced chemically as envelopes around or attachment to the particles of the α-alumina powder, and
  an organic vehicle dissolved or suspended in an organic or aqueous solvent,
   with the total α-alumina and auxiliary-sintering-agent content of the paste, the foil, or the slip ranging between 50% and 70%; and beating the bodies to a temperature of not more than 1,300° C. and then allowing them to cool down,
  with the alumina content of the joint after cooling being at least 95 wt. % and the auxiliary-sintering-agent content after cooling being not more than 5 wt. %.

2. A process as claimed in claim 1 wherein the total α-alumina and auxiliary sintering agent is comprised of at least 99.9 wt. % α-alumina.

3. A process as claimed in claim 2 wherein, in addition to the temperature, a pressure acts on the bodies.

4. A process as claimed in claim 1 wherein, in addition to the temperature, a pressure acts on the bodies.

5. A process as claimed in claim 1 wherein, the particles of the anorganic oxidic powder of the auxiliary sintering agent are the same size as the particles of the α-alumina powder.

6. A process for forming a joint, by means of a joining material, in a ceramic absolute-pressure or differential-pressure sensor having a substrate and a diaphragm the substrate and diaphragm each made of sintered, polycrystalline alumina ceramic with a purity greater than 92 wt. % or of sapphire, the diaphragm being connected to the substrate with the joining material near its edge so as to form a long-time-vacuum-tight, high-strength, corrosion-resistant joint and an internal chamber, the process comprising the steps of:

interposing the joining material in the form of a paste, a foil, or a slip between the substrate and the diaphragm, the joining material being made from
  an agglomerate-free, high-purity α-alumina powder with particles of a size not exceeding 100 nm (=$10^{-7}$ m),
  an anorganic oxidic powder of an auxiliary sintering agent with particles of a size not exceeding 100 nm, and
  an organic vehicle which is dissolved or suspended in an organic or aqueous solvent and in which the particles of the respective powder are substantially evenly distributed,
  wherein the total α-alumina and auxiliary-sintering-agent content of the paste, the foil, or the slip ranges between 50% and 70%, or with the joining material being made from
  an agglomerate-free, high-purity α-alumina powder with particles of a size not exceeding 100 nm (=$10^{-7}$ m),
  an anorganic oxidic auxiliary sintering agent produced chemically as envelopes around or attachment to the particles of the α-alumina powder, and
  an organic vehicle dissolved or suspended in an organic or aqueous solvent,
  wherein the total α-alumina and auxiliary-sintering-agent content of the paste, the foil, or the slip ranges between 50% and 70%; and heating the substrate and the diaphragm to a temperature of not more than 1,300° C. and then allowing them to cool down,
  wherein the alumina content of the joint after cooling is at least 95 wt. % and the auxiliary-sintering-agent content after cooling is not more than 5 wt. %.

7. The process of claim 6, wherein the total α-alumina and auxiliary sintering agent is comprised of at least 99.9 wt. % α-alumina.

8. The process of claim 7, further comprising the step of applying a pressure to the substrate and the diaphragm during the heating step.

9. The process of claim 6, further comprising the step of applying a pressure to the substrate and the diaphragm during the heating step.

10. The process of claim 6 wherein, the particles of the anorganic oxidic powder of the auxiliary sintering agent are the same size as the particles of the α-alumina powder.

* * * * *